(12) United States Patent
Karim

(10) Patent No.: US 7,729,607 B2
(45) Date of Patent: Jun. 1, 2010

(54) CAMERA GLARE REDUCTION SYSTEM AND METHOD

(75) Inventor: John H. Karim, Cypress, CA (US)

(73) Assignee: Technologies4All, Inc., Cypress, CA (US)

(*) Notice: Subject to any disclaimer, the term of this patent is extended or adjusted under 35 U.S.C. 154(b) by 633 days.

(21) Appl. No.: 11/443,705

(22) Filed: May 31, 2006

(65) Prior Publication Data

US 2007/0280669 A1    Dec. 6, 2007

(51) Int. Cl.
G03B 15/03 (2006.01)
G03B 7/099 (2006.01)
H04N 5/225 (2006.01)

(52) U.S. Cl. .................. 396/155; 396/176; 396/241; 396/275; 348/342; 348/360; 362/18; 362/19

(58) Field of Classification Search .............. 396/155, 396/176–178, 241, 275; 359/303, 304, 352, 359/362; 250/208.1, 214 R, 214.1; 356/364, 356/453, 487, 491; 358/906; 348/342, 360; 362/3, 11, 18, 19
See application file for complete search history.

(56) References Cited

U.S. PATENT DOCUMENTS

| | | |
|---|---|---|
| 1,733,915 A | 10/1929 | Short |
| 1,734,022 A | 10/1929 | Short |
| 1,873,951 A | 8/1932 | Zocher |
| 1,918,848 A | 7/1933 | Land et al. |
| 2,005,426 A | 6/1935 | Land |
| 2,031,045 A | 8/1936 | Land |
| 2,087,795 A | 7/1937 | Chubb |
| 2,099,694 A | 11/1937 | Land |
| 2,102,632 A | 12/1937 | Land |
| 2,123,901 A | 7/1938 | Land |
| 2,180,114 A | 11/1939 | Land |
| 2,185,000 A | 12/1939 | Land |
| 2,237,565 A | 4/1941 | Land |
| 2,237,566 A | 4/1941 | Land |
| 2,255,933 A | 9/1941 | Land |
| 2,301,126 A | 11/1942 | Kriebel |
| 2,334,446 A | 11/1943 | Serrell |
| 2,475,921 A | 7/1949 | Smith |
| 2,819,459 A | 1/1958 | Dodd |
| 2,887,566 A | 5/1959 | Marks |
| 3,026,763 A | 3/1962 | Marks |
| 3,621,231 A | 11/1971 | Craig |
| 3,631,288 A | 12/1971 | Rogers |
| 3,714,413 A | 1/1973 | Craig |

(Continued)

*Primary Examiner*—Rochelle-Ann J Blackman
(74) *Attorney, Agent, or Firm*—Fountain Law Group, Inc.; George L. Fountain

(57) ABSTRACT

Various image-capturing systems are disclosed that use polarized filters to reduce or control glare effects on captured images. In one embodiment, the system includes a light source, a first polarized filter adapted to polarize light emanating from the light source; a second polarized filter adapted to perform polarized filtering on received light; and an image-capturing device adapted to receive the filtered light. In another embodiment, the system further includes an actuator to selectively move any of the polarized filter into and out of the light path. In yet another embodiment, a method of forming a resultant image comprises recording a first image with a filter set to a first polarization angle, recording a second image with the filter set to a second polarization angle, and blending the first and second images. The recording of the first and second images may be performed simultaneously or at different times.

21 Claims, 5 Drawing Sheets

U.S. PATENT DOCUMENTS

| | | |
|---|---|---|
| 3,840,731 A | 10/1974 | Säufferer |
| 4,286,308 A | 8/1981 | Wolff |
| 4,473,277 A | 9/1984 | Brown |
| 5,252,997 A | 10/1993 | Christenbery |
| 5,447,353 A | 9/1995 | Cheng et al. |
| 5,708,522 A | 1/1998 | Levy |
| 6,038,024 A | 3/2000 | Berner |
| 6,055,053 A * | 4/2000 | Lesniak .................. 356/366 |
| 6,056,397 A | 5/2000 | Berlad |
| 6,088,541 A | 7/2000 | Myer |
| 6,636,278 B1 * | 10/2003 | Dultz et al. .............. 349/25 |
| 6,646,801 B1 | 11/2003 | Sley |
| 2003/0103261 A1 * | 6/2003 | Hay ...................... 359/352 |
| 2004/0061939 A1 * | 4/2004 | Bievenour et al. ......... 359/502 |
| 2004/0249274 A1 | 12/2004 | Yaroslavsky |
| 2007/0247553 A1 * | 10/2007 | Matusik .................. 348/595 |

\* cited by examiner

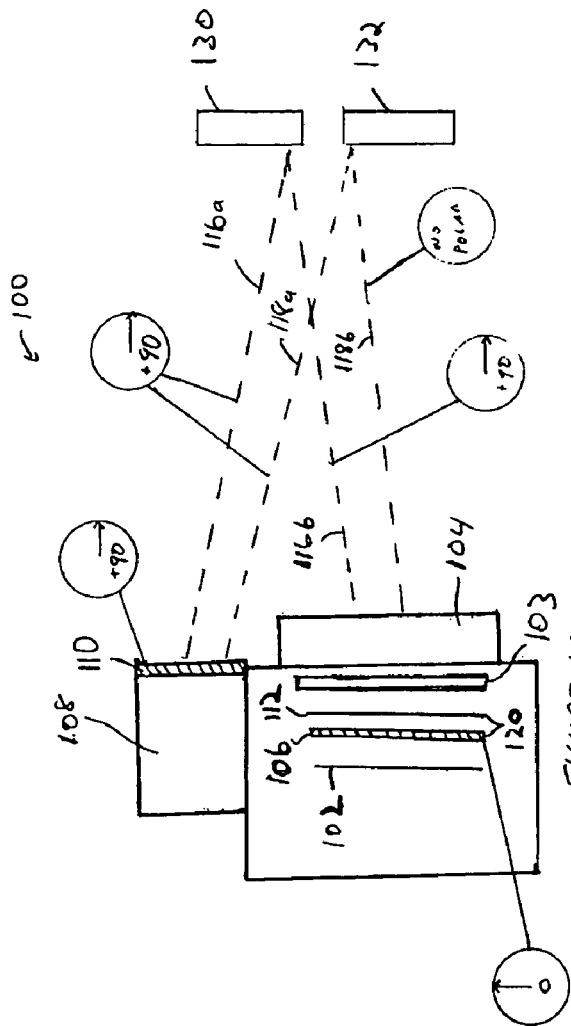
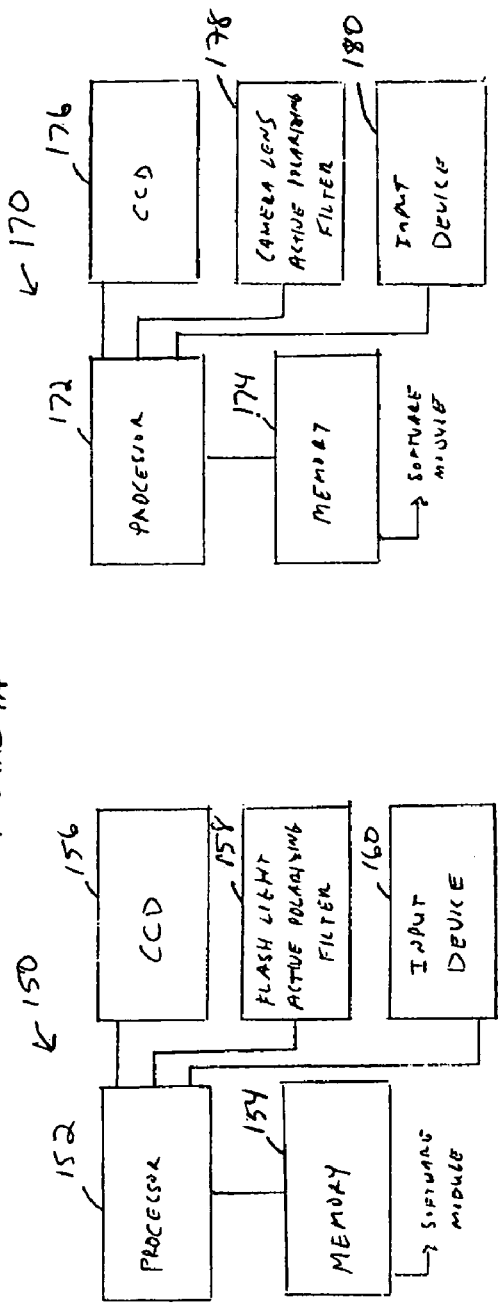
FIGURE 1A
FIGURE 1B
FIGURE 1C

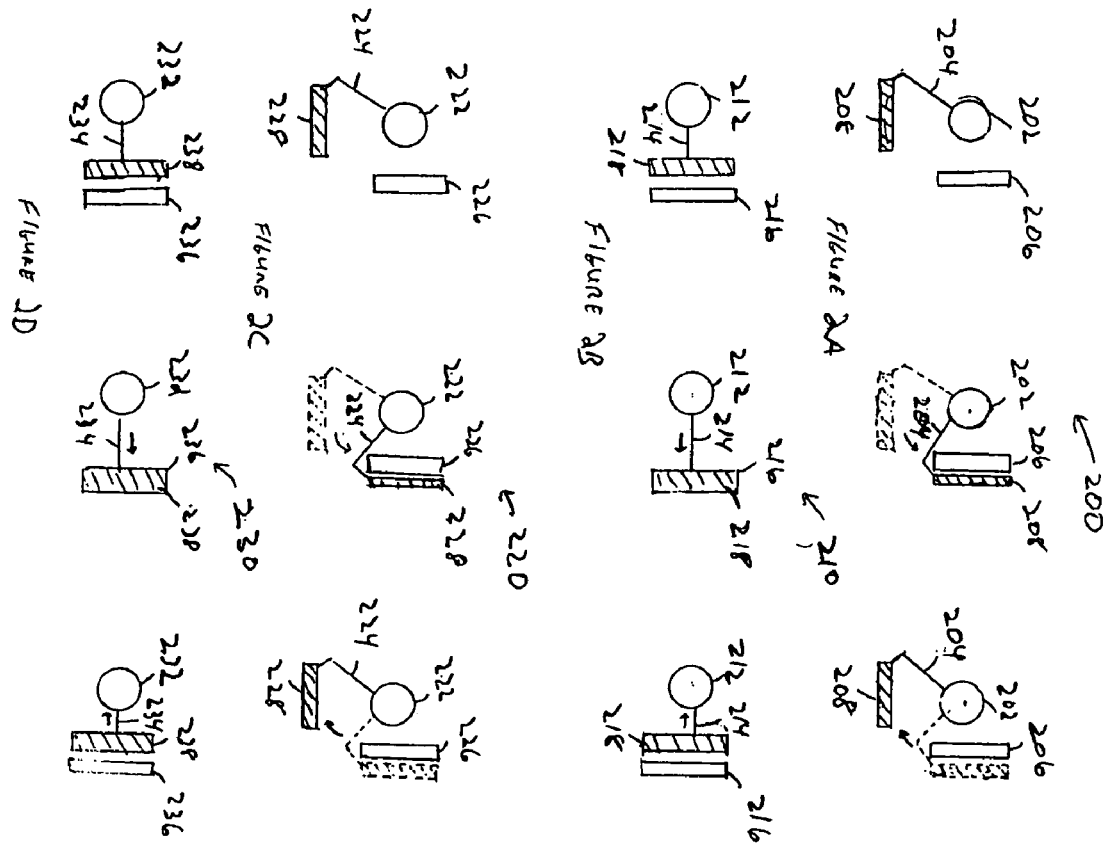
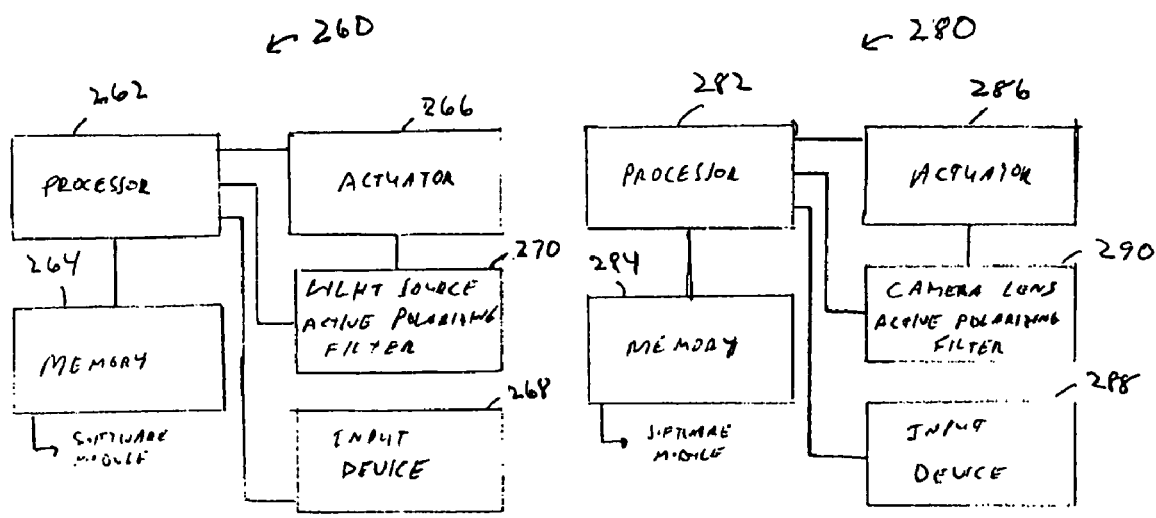

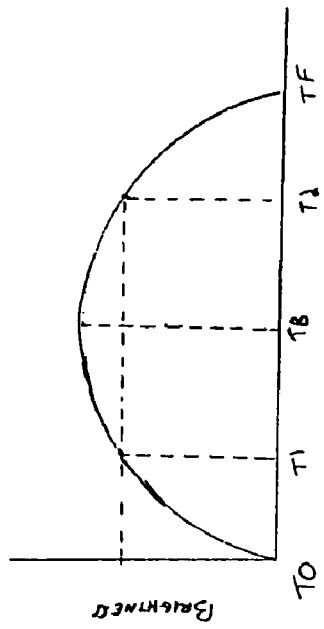
FIGURE 3B
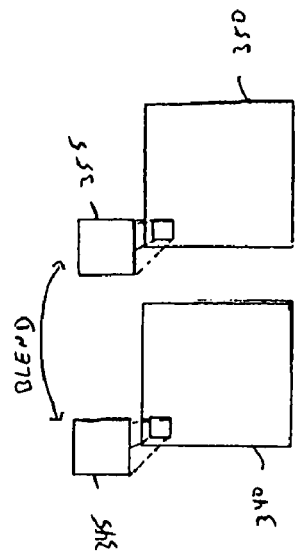
FIGURE 3C
$$\frac{(X1)(\beta)}{100} + \frac{X2(100-\beta)}{100} = X3$$
FIGURE 3D
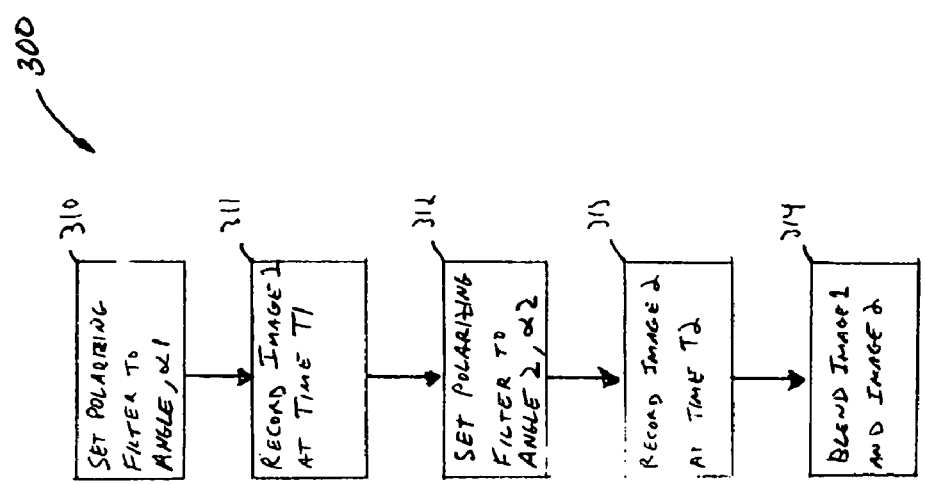
FIGURE 3A

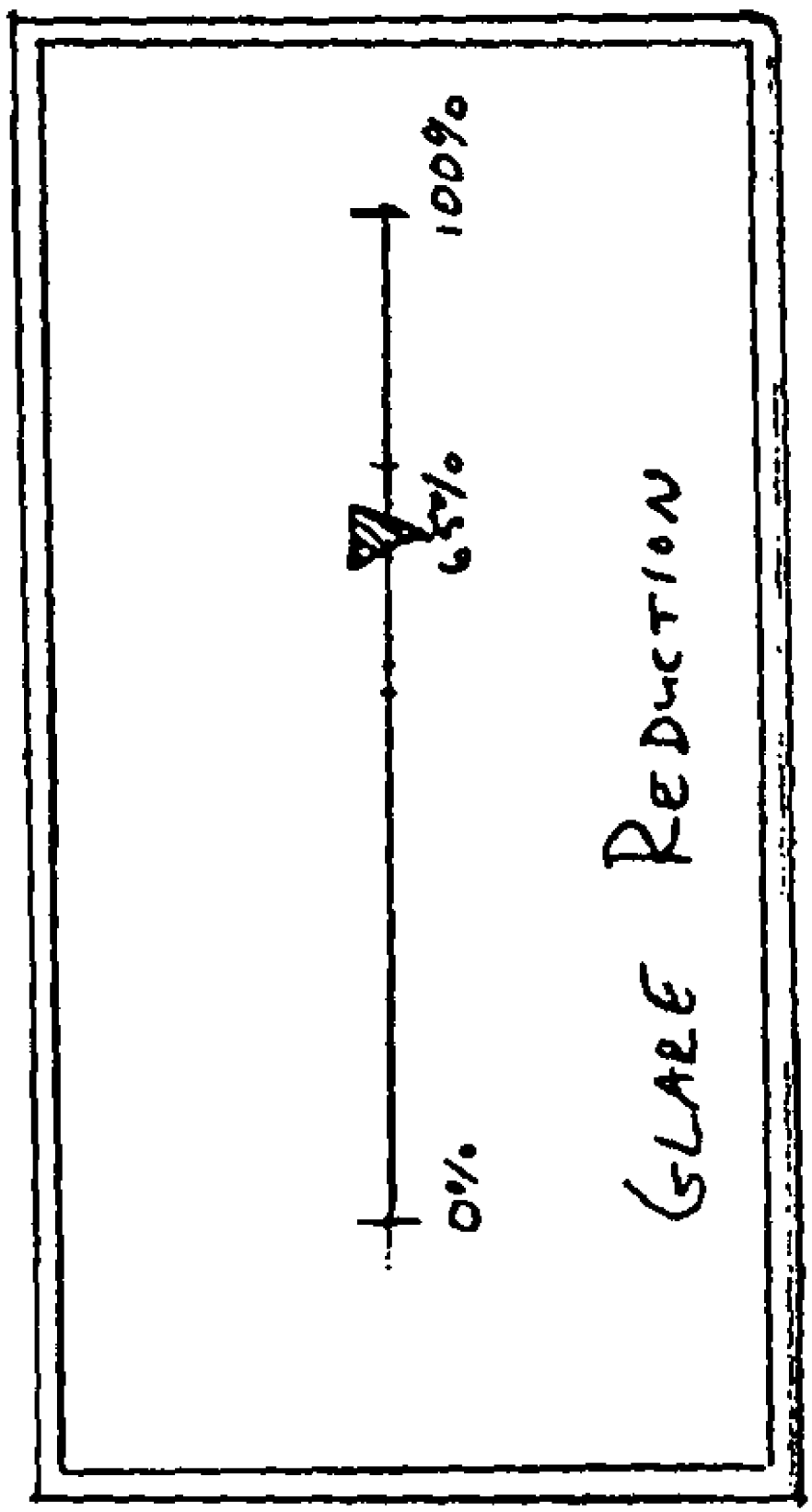

CAMERA GLARE REDUCTION SYSTEM AND METHOD

FIELD OF THE INVENTION

This invention relates generally to selective light transmitting and receiving systems and methods, and in particular, to a selective light transmitting and receiving system and method that use polarized filters to remove unwanted camera glare and/or other light emissions.

BACKGROUND OF THE INVENTION

Photography is an immensely popular activity. The works of professional still-picture photographers are illustrated everyday in newspapers, magazines, and advertisements, and the works of professional moving-picture photographers are present in television and films. Countless amateur photographers take pictures to capture many life's events. Further, with recent technological advances in cameras, along with accompanying price drops, even the most mundane activities and events are now recorded.

An early problem encountered in photography was glare directly from the Sun or by way of reflective objects. A small portion of sunlight is polarized when it passes through our atmosphere. The atmospheric haze as well as the polarized light reflected by objects cause glare that is then recorded in images taken by still-picture or video cameras. In some cases, this glare may be undesirable and can adversely affect the clarity of the taken images.

To address the problem of unwanted glare, certain types of polarized filters are used in photography to reduce glare. A portion of the light received from the sun is polarized generally in the horizontal direction. Most polarized filters used on cameras have a vertical polarization axis, i.e., they are configured to pass light polarized in the vertical direction, and block light polarized in the horizontal direction. Accordingly, these polarized filters can remove some of the atmospheric haze and reflected sunlight, leading to a reduction in unwanted glare.

However, the use of polarized filters does not protect well against glare emanating from most man-made light sources, such as camera light sources including flash sources and spot light sources. Light from a flash or lamp is typically not polarized. When light from a camera is reflected off a reflective object, such as a window, mirror, or even skin, it is not polarized. Accordingly, camera polarized filters cannot effectively reduce glare caused by most man-made light sources. Thus, the image taken is susceptible to impaired image quality due to glare emanating from camera light sources.

SUMMARY OF THE INVENTION

In one embodiment, a camera or video system is disclosed. The system comprises a light source, a first polarized filter configured to polarize light emanating from the light source, a second polarized filter adapted to perform polarized filtering on a received light of which at least a portion originates from the light source; and an image-capturing device adapted to receive the filtered light. Because the light emanating from the light source is polarized, the polarized filter at the image-capturing device is able to block the polarized light reflected off reflective objects. Thus, the system is able to reduce unwanted glare and/or other light emission.

In another embodiment, a camera or video system is disclosed. The system comprises a light source, an image-capturing device adapted to receive light from said light source; a polarized filter; and an actuator adapted to selectively move the polarized filter into the path of the light. Thus, the system allows a user to selectively position the polarized filter to perform improved glare reduction.

In yet another embodiment, a method of generating a resultant image is disclosed. The method comprises setting an active polarizing filter to a first polarization angle; recording a first image at a first time, wherein at least a portion of light used to generate the first image passes through the active polarizing filter when set to the first polarization angle; setting the active polarizing filter to a second polarization angle that is different than the first polarization angle; recording a second image at a second time different than the first time, wherein at least a portion of the light used to generate the second image passes through the active polarizing filter when set to the second polarization angle; and blending the first and second images to form the resultant image.

In yet another embodiment, a camera or video system is disclosed. The system comprises a light source; a first polarized filter configured to polarize light emanating from the light source; a beam splitter adapted to split a portion of the polarized light into first and second light components; a second polarized filter adapted to perform polarized filtering on the first light component; a first image-capturing device adapted to receive the filtered first light component; a third polarized filter adapted to perform polarized filtering on the second light component; and a second image-capturing device adapted to receive the filtered second light component. The system may further include a processor adapted to generate a resultant image by blending the respective images generated by the first and second image-capturing devices.

Other aspects, features, and techniques of the invention will be apparent to one skilled in the relevant art in view of the following detailed description of the invention.

BRIEF DESCRIPTION OF THE DRAWINGS

FIG. 1A illustrates a side view of an exemplary camera glare reduction system in accordance with an embodiment of the invention;

FIG. 1B illustrates a block diagram of an exemplary camera glare reduction control system in accordance with another embodiment of the invention;

FIG. 1C illustrates a block diagram of an exemplary camera glare reduction control system in accordance with another embodiment of the invention;

FIG. 2A illustrates a side view of an exemplary polarized filter movement mechanism in accordance with another embodiment of the invention;

FIG. 2B illustrates a front view of an exemplary polarized filter movement mechanism in accordance with another embodiment of the invention;

FIG. 2C illustrates a side view of an exemplary polarized filter movement mechanism in accordance with another embodiment of the invention;

FIG. 2D illustrates a front view of an exemplary polarized filter movement mechanism in accordance with another embodiment of the invention;

FIG. 2E illustrates a block diagram of an exemplary control system for adjusting the position of a polarized filter in accordance with another embodiment of the invention;

FIG. 2F illustrates a block diagram of an exemplary control system for adjusting the position of a polarized filter in accordance with another embodiment of the invention;

FIG. 3A illustrates a flow chart of an exemplary method of reducing glare effects in an image taken by a camera in accordance with another embodiment of the invention;

FIG. 3B illustrates an exemplary flash light brightness versus time curve of a camera glare reduction method in accordance with another embodiment of the invention;

FIG. 3C illustrates an exemplary image blending method of a camera glare reduction system in accordance with another embodiment of the invention;

FIG. 3D illustrates an exemplary blending function of a camera glare reduction system in accordance with another embodiment of the invention;

FIG. 3E illustrates a front view of an exemplary graphical user interface of a camera glare reduction system in accordance with another embodiment of the invention.

DETAILED DESCRIPTION OF THE EXEMPLARY EMBODIMENTS

Figure 4:
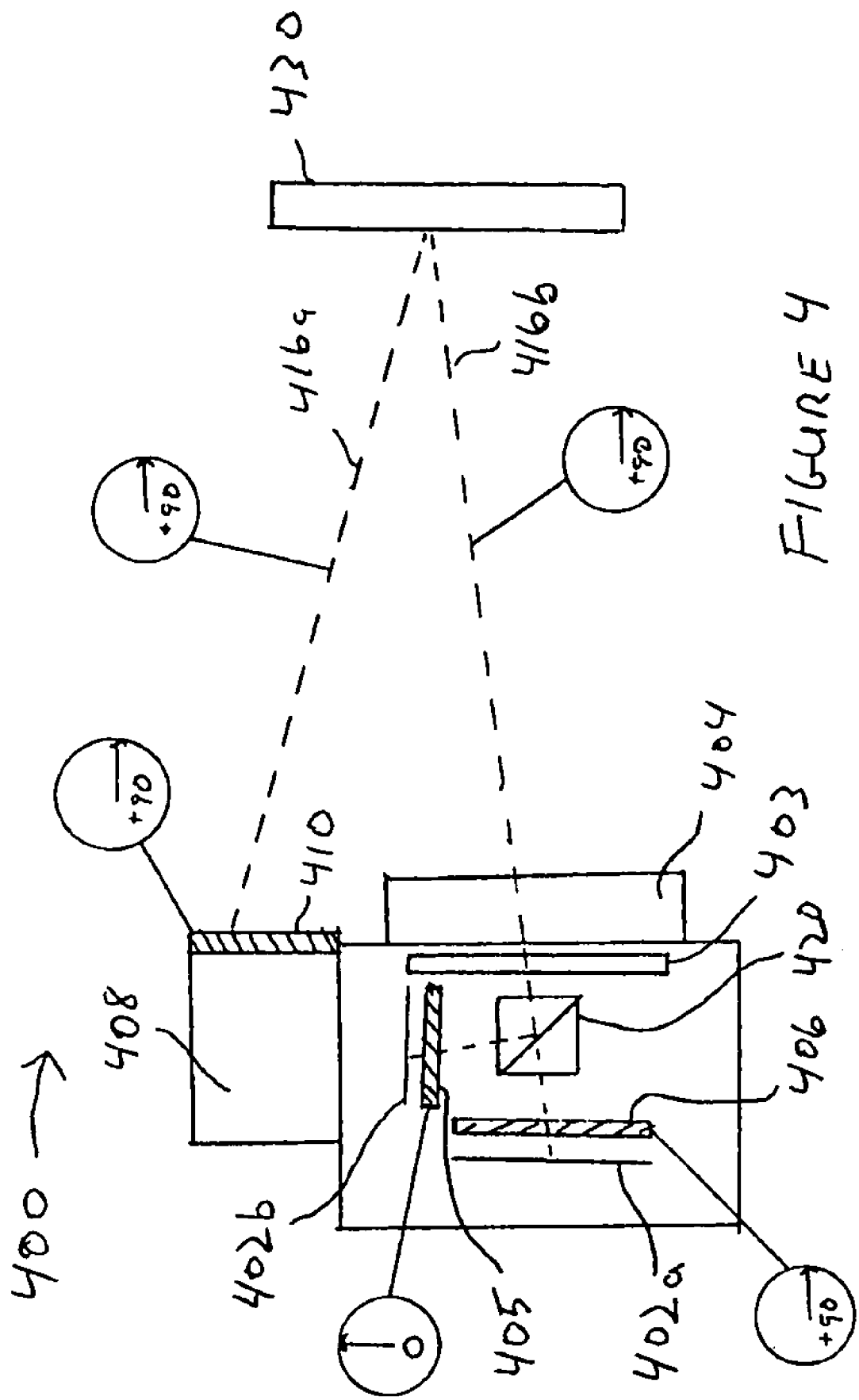
FIG. 4 illustrates a side view of an exemplary camera glare reduction system in accordance with an embodiment of the invention.

FIG. 1A illustrates a side view of an exemplary camera glare reduction system 100 in accordance with an embodiment of the invention. The camera glare reduction system 100 comprises an image-capturing device 102 (e.g., a film or a charged coupled device (CCD)), a shutter 103, a lens 104, a flash light source 108, a first polarized filter 110, and an active polarized filter 120. The active polarized filter 120 comprises a liquid crystal layer (LCL) 112 and a second polarized filter 106. The first polarized filter 110 polarizes the light emanating from the flash light source 108 in a substantially horizontal orientation (e.g., +90 degrees). The second polarized filter 106 has a substantially vertical (e.g., zero (0) degree) polarization. In combination with the second polarized filter 106, the LCL 112 selectively adjusts the effective polarization θ of the active polarized filter 120 by rotating the polarization of the incident light. In an exemplary embodiment, the effective polarization θ of the active polarized filter 120 may vary from zero (0) to 90 degrees. As explained below, such camera glare reduction system 100 reduces glare attributed to the flash light source 108 and other sources.

During a flash event, the light 116a and 118a emanating from the flash light source 108 and filter 110 get polarized in a substantially horizontal orientation (e.g., +90 degrees). In this example, light 116a strikes a substantially reflective object 130. When polarized light 116a reflects off the substantially reflective object 130, the polarization of the reflected light 116b remains substantially horizontally polarized. As discussed above, the LCL 112 selectively adjusts the effective polarization θ of the active polarized filter 120. If the LCL 112 is set to provide an effective polarization θ of 90 degrees for the active polarized filter 120, the horizontally-polarized light 116b passes through the filter 120 substantially unchanged. On the other hand, if the LCL 112 is set to provide an effective polarization θ of zero (0) degree, the filter 120 substantially blocks the light 116b. By varying the effective polarization θ of the active polarized filter 120, the camera glare reduction system 100 is able to selectively reduce unwanted glare emanating from reflective objects.

On the other hand, light reflecting off of substantially non-reflective objects is able to propagate through the active polarized filter 120 regardless of the LCL 112 setting. For example, the substantially horizontally polarized light 118a strikes a generally non-reflective object 132. The light 118b reflecting off the generally non-reflective object 132 substantially loses its polarization. Accordingly, the active polarized filter 120 allows such light 118b to pass through to the image-capturing device 102 regardless of the setting of the LCL 112. Thus, in addition to reducing unwanted light reflecting off of substantially reflective objects, the camera glare reduction system 100 allows the capture of light reflecting off generally non-reflective objects, which is often desirable in pictures. Although a still-picture camera is used to exemplify the invention, it shall be understood that the invention is also applicable to video cameras where the light source 108 is continuously illuminating.

In addition to reducing unwanted glare, the camera system 100 may also be capable of reducing "red eye" typically reflecting off the back of a person's eye. If, for example, such a person wears eyewear such as contacts that are polarized in a substantially vertical orientation, the light emanating from the flash light 108, being polarized in a substantially horizontal orientation, does not significantly pass through the eyewear. Therefore, light reflection off the back of a person's eye is substantially reduced, thereby eliminating "red eye".

Although a camera glare reduction system 100 containing filters that have polarization axes that are substantially orthogonal to one another is used to exemplify the invention, it shall be understood that the invention is also applicable to a system 100 where the two filters have substantially the same polarization axis. For example, if the polarization of both filter 110 and 106 is substantially horizontal (e.g., +90 degrees), the LCL 112, which selectively rotates the polarization of the incident light, may still change the effective polarization of the active polarized filter 120. If the LCL 112 is set to not rotate the incident light, the effective polarization of the active polarized filter 120 is that of the fixed filter 106, which, in this example, is horizontally polarized. Thus, the horizontally-polarized light 116b passes through the filter 102 substantially unchanged; thereby, selectively configuring the active polarized filter 120 for lower glare reduction. If, on the other hand, the LCL 112 is set to rotate the incident light 116b by 90 degrees, the light 116b will be substantially blocked by the second polarized filter 106 since the angle of polarized light 116b is now substantially orthogonal to the polarized filter 106; thereby, selectively configuring the active polarized filter 120 for enhanced glare reduction.

Although, in this example, the active polarized filter 120 is located in front of the image-capturing device 102, it shall be under stood that the invention is also applicable to a system where the active polarized filter is located in front of the flash light source 108, and a fixed polarized filter is located in front of the image-capturing device 102. The camera glare reduction system 100 may also incorporate two active polarized filters; one in front of the flash light source 108 and one in front of the image-capturing device 102.

Furthermore, although a camera glare reduction system 100 with a single first polarized filter 110 and a single second polarized filter 106 is used to exemplify the invention, it shall be under stood that the invention is also applicable to a system where one or more additional filters (i.e., notch filters) are used in conjunction with the polarization filters to increase the working range of the visual light spectrum of the camera system 100.

FIG. 1B illustrates a block diagram of an exemplary camera glare reduction control system 150 in accordance with another embodiment of the invention. The camera glare reduction control system 150 comprises a processor 152, a memory 154, a CCD device 156, a flash light active polarizing filter 158, and an input device 160. The processor 152 performs the various operations of the camera glare reduction control system 150, as discussed below; the CCD 156 captures the light image being received; the flash light active polarizing filter 158 polarizes the light emanating from a flash light source under the control of the processor 152; the input device 160 allows a user of the system 150 to provide instructions to the processor 152, such as the polarization orientation with which to set the flash light active polarizing filter 158; and the memory 154, serving generally as a computer readable medium, stores one or more software modules adapted to control the processor 152 in performing its intended operations.

In operation, the processor 152 receives a signal from the input device 160 indicating a desired polarization orientation of the flash light active polarizing filter 158. For example, a user using the input device 160 may instruct the processor 152 to set up the flash light active polarizing filter 158 for a desired polarization orientation of +40 degrees. In response to such input, the processor 152 then sends a control signal to the flash light active polarizing filter 158 to set it up for the desired polarization.

The polarization of the flash light and subsequent filtering of the received light as discussed above may affect the desired image being received. For instance, such polarization and filtering may add a shade of gray to the image being received. To address this issue, the processor 152 or a graphics processing module (not shown) may perform image processing to correct for any distortion to the image being received as a result of the polarization and subsequent filtering, or to perform any other type of image processing. The processor 152 or graphics processing module may perform this image processing by an equation or algorithm implemented by one or more software modules and/or by a look-up table stored in the memory 154.

FIG. 1C illustrates a block diagram of an exemplary camera glare reduction control system 170 in accordance with another embodiment of the invention. The camera glare reduction control system 170 comprises a processor 172, a memory 174, a CCD device 176, a camera lens active polarizing filter 178, and an input device 180. The processor 172 performs the various operations of the camera glare reduction control system 170, as discussed below; the CCD 176 captures the light image being received; the camera lens active polarizing filter 178 performs polarized filtering of the incident light received under the control of the processor 172; the input device 180 allows a user of the system 170 to provided instructions to the processor 172, such as the polarization orientation with which to set the camera lens active polarizing filter 178; and the memory 174, serving generally as a computer readable medium, stores one or more software modules adapted to control the processor 172 in performing its intended operations.

In operation, the processor 172 receives a signal from the input device 180 indicating a desired polarization orientation of the camera lens active polarizing filter 178. For example, using the input device 180 may instruct the processor 172 to set up the camera lens active polarizing filter 178 for a desired polarization orientation of −72 degrees. In response to such input, the processor 172 then sends a control signal to the camera lens active polarizing filter 178 to set it up for the desired polarization.

The polarization of the flash light and subsequent filtering of the received light as discussed above may affect the desired image being received. For instance, such polarization and filtering may add a shade of gray to the image being received. To address this issue, the processor 172 or a graphics processing module (not shown) may perform image processing to correct for any distortion to the image being received as a result of the polarization and subsequent filtering, or to perform any other type of image processing. The processor 172 or graphics processing module may perform this image processing by an equation or algorithm implemented by the software module(s) or by a look-up table stored in the memory 174.

FIG. 2A illustrates a side view of an embodiment of a polarized filter movement mechanism 200 of a camera glare reduction system. The polarized filter mechanism 200 comprises an actuator 202, a polarized filter 208 mechanically coupled to the actuator 202 by way of an arm 204, and a light source 206. In response to a signal from a processor, the actuator 202 may rotate to move the polarized filter 208 between a non-polarizing position in which the filter 208 is not in the path of the light emanating from the light source 206, and a polarizing position in which the filter 208 is in the path of the light emanating from the light source 206. As illustrated in FIG. 2A, the actuator 202 first moves the filter 208 from the non-polarizing position (the left diagram) to the polarizing position (the middle diagram) and then back to the non-polarizing position (the right diagram).

FIG. 2B illustrates a front view of another embodiment of a polarized filter movement mechanism 210 of a camera glare reduction system. The polarized filter mechanism 210 comprises an actuator 212, a polarized filter 218 coupled to the actuator 212 via an arm 214, and a light source 216. In response to a signal generated by a processor, the actuator 212 linearly moves the polarized filter 208 between a non-polarizing position in which the filter 218 is not in the path of the light emanating from the light source 216, and a polarizing position in which the filter 218 is in the path of the light emanating from the light source 216. As illustrated in FIG. 2B, the actuator 212 first moves the filter 218 from the non-polarizing position (the left diagram) to the polarizing position (the middle diagram) and then back to the non-polarizing position (the right diagram).

Alternatively, in another embodiment, the polarized filter may remain in a fixed position and the actuator will act upon the light source to move the light source into and out of the position that allows the polarized filter to polarize the light emanating from light source. In yet another embodiment, both the polarized filter and the light source may be set to fixed positions, and mirrors or other device may selectively direct the light emanating from the light source through the filter. In still another embodiment, the polarized filter may be fixed in a position to always polarize the light emanating from light source.

FIG. 2C illustrates a side view of another embodiment of a polarized filter movement mechanism 220 of a camera glare reduction system. The polarized filter mechanism 220 comprises an actuator 222, a polarized filter 228 coupled to the actuator 222 via an arm 224, and an image-capturing device 226. In response to a signal from a processor, the actuator 222 may rotate to move the polarized filter 228 into and out of a position in which it perform polarized filtering of incident light before it reaches the image-capturing device 226. As illustrated in FIG. 2C, the actuator 222 first moves the filter 228 from the non-polarizing position (the left diagram) to the polarizing position (the middle diagram) and then back to the non-polarizing position (the right diagram).

FIG. 2D illustrates a front view of another embodiment of a polarized filter movement mechanism 230 of a camera glare reduction system. The polarized filter mechanism 230 comprises an actuator 232, a polarized filter 238 mechanically coupled to the actuator 232 via an arm 234, and an image-capturing device 236. In response to a signal from a processor, the actuator 232 may move linearly to move the polarized filter 238 into and out of a position in which it performs polarized filtering of incident light before it reaches the image-capturing device 236. As illustrated in FIG. 2D, the actuator 232 first moves the filter 238 from the non-polarizing position (the left diagram) to the polarizing position (the middle diagram) and then back to the non-polarizing position (the right diagram).

Alternatively, in another embodiment, the polarized filter may remain in a fixed position and the actuator will act upon the image-capturing device to move the image-capturing device into and out of the position that allows the polarized filter to perform polarized filtering of the incident light. In yet another embodiment, both the polarized filter and the image-capturing device may be set to fixed positions, and mirrors or other devices may selectively direct the incident light through the filter before it reaches the image-capturing device. In still another embodiment, the polarized filter may be fixed in a position to always perform polarized filtering of the incident light.

FIG. 2E illustrates a block diagram of an exemplary control system 260 for adjusting the position of a polarized filter in accordance with another embodiment of the invention. The control system 260 comprises a processor 262, a memory 264, an actuator 266, an input device 268, and a light source active polarizing filter 270. The processor 262 performs the various operations of the control system 260 as discussed below; the light source active polarizing filter 270 polarizes the light emanating from a light source under the control of the processor 262; the actuator 266 moves the light source active polarizing filter 270 into and out of a polarizing position in which the filter polarizes the light emanating from a light source; the input device 268 allows a user of the system 260 to provide instructions to the processor 262, such as to move the polarizing filter 270 into and out of polarizing position and the selected polarization of the filter 270; and the memory 264, serving generally as a computer readable medium, stores one or more software modules adapted to control the processor 262 in performing its intended operations.

In operation, the processor 262 receives a signal from the input device 268 indicating a desired position of the light source active polarizing filter 270. For example, a user using the input device 268 may instruct the processor 262 to move the polarizing filter 270 into the polarizing position. In response to such input, the processor 262 sends a control signal to the actuator 266 to move the polarizing filter 270 into the desired position. Additionally, in response to user instruction received from the input device 268, the processor 262 may send another control signal to the light source active polarizing filter 270 to control the degree of polarization of the filter 270.

FIG. 2F illustrates a block diagram of an exemplary control system 280 for adjusting the position of a polarized filter in accordance with another embodiment of the invention. The control system 280 comprises a processor 282, a memory 284, an actuator 286, an input device 288, and a camera lens active polarizing filter 290. The processor 282 performs the various operations of the polarized filter movement control system 280 as discussed below; the camera lens active polarizing filter 290 performs polarized filtering of incident light under the control of the processor 282; the actuator 286 moves the camera lens active polarizing filter 290 into and out of the polarizing position to selectively perform polarized filtering of incident light; the input device 288 allows a user of the system 280 to provide instructions to the processor 282, such as the movement of the camera lens active polarizing filter 290 into and out of the polarizing position and the selected polarization of the filter 290; and the memory 284, serving generally as a computer readable medium, stores one or more software modules adapted to control the processor 282 in performing its intended operations.

In operation, the processor 282 receives a signal from the input device 288 indicating a desired position of the camera lens active polarizing filter 290. For example, a user using the input device 288 may instruct the processor 282 to move camera lens active polarizing filter 290 into the polarizing position to perform polarized filtering of incident light. In response to such input, the processor 282 then sends a control signal to the actuator 286 to move the camera lens active polarizing filter 290 into the desired position. Additionally, in response to user instruction received from the input device 288, the processor 282 may also send another control signal to the camera lens active polarizing filter 290 to control the degree of polarization of the filter 290.

FIG. 3A illustrates a flow chart of an exemplary method 300 of reducing glare effects in an image taken by a camera in accordance with another embodiment of the invention. The method 300 generally comprises blending two images of the same subject that are recorded at substantially the same brightness level, at two different but relatively close times, and with differing camera glare reduction settings. According to the method 300, the polarization of a camera active polarizing filter is set to a first angle, $\alpha 1$ (block 310). The camera then records a first image of the subject at time T1 (block 311). The polarization of the camera active polarizing filter is set to a second angle, $\alpha 2$ (block 312). The camera then records a second image of the subject at time T2 (block 313). In response to the user input, the camera then generates a resultant image by blending at least a portion of the first image with at least a portion of the second image using a selected blending parameter as discussed below.

FIG. 3B illustrates a time versus flash light brightness curve depicting the timing of the recording of image 1 and image 2 in accordance with another embodiment of the invention. Time T0 is the time when the flash light is first triggered and begins emanating light. Time TB is the point at which the light emanating from the flash light is at its brightest point. Time TF is the time when light is no longer emanating from the flash light. As described above, the first image is recorded at time T1 and the second image is recorded at time T2. The brightness of light emanating from the flash light is substantially the same at times T1 and T2. It should be understood that T1 and T2 can occur anywhere along the brightness curve. In an exemplary embodiment, the first and second images are taken at different times T1 and T2, and when the brightness of the flash light is substantially the same. Although a flash light is used to exemplify the invention, it shall be understood that the invention is also applicable to video cameras where the light source is continuously illuminating.

In an exemplary embodiment, the user selects a filter polarization angle of $\alpha 1$ that provides substantially complete reduction in the camera glare, and filter polarization angle of $\alpha 2$ that provides for substantially no reduction in the camera glare. The user then may selectively control the amount of blending of the first and second images based on the amount of glare reduction the user desires. In an exemplary embodiment, the blending of the first and second images is accomplished at the pixel level of the images taken.

FIG. 3C illustrates an exemplary image blending method in accordance with an embodiment of the invention. Pixel A1 345 of the first image 340 will be selectively blended with pixel A2 355 of the second image 350. Pixel A1 345 and pixel A2 355 may be located in substantially the same position of pixel arrays of the first and second images 340 and 350, respectively. In an exemplary embodiment, an algorithm may be used to blend the two images based on a user's selected glare reduction.

FIG. 3D illustrates an exemplary camera glare reduction algorithm in accordance with an embodiment of the invention. X1 represents an image value of a pixel of the first image with full glare reduction, X2 represents an image value of the corresponding pixel in the second image with no glare reduction, X3 represents the image value of the corresponding pixel of the resulting blended image, and β represents the blending parameter selected by the user. For example, if the images in the camera are stored as RGB values, each red, green, blue, the values of the pixel of the first image may be selectively blended with the values of the corresponding pixel in the second image.

As an example, if the user selects 65 percent blending parameter, then the blended image will consist of 65 percent of the RGB value of the pixel of the first image, and 35 percent of the RGB value of the pixel of the second image. In this example, the red color value for pixel A1, R1, is multiplied by 65 percent. The red color value for pixel A2, R2, is multiplied by 100 percent minus 65 percent which is 35 percent. The new red color values of pixel A1 and A2 will then be added to one another to give a blended red color value for the pixel of the blended image. This process is then repeated for the green and blue color values of pixels A1 and A2 and the whole process is repeated for the entire pixel array or selected pixels of the first and second images to form the resultant blended image. Although a RGB color scheme is used to exemplify the invention, it should be understood that the invention is also applicable to any image scheme conceivable by one skilled in the art.

Although, in this embodiment, the first image was selected as the one to have substantially complete reduction in camera glare, it should be understood that the glare reduction amount for the first and second images may be reversed where the second image is the one with substantially complete glare reduction and the first image is selected to have substantially no reduction in camera glare. In another preferred embodiment, the user may selectively blend multiple areas of the first and second images by different amounts. This would allow the user to reduce glare in only selected portions of the image or reduce glare by varying amounts in different portions of the image. In yet another embodiment, the user may transfer the first and second images to another device, such as a computer, and selectively blend the images via an accompanying software program. In still another embodiment, a user may select a blending parameter, β, which provides the amount of reduction in camera glare that the user desires. In this embodiment, only the blended image is saved once the blending of two images is achieved.

FIG. 3E illustrates a front view of an exemplary graphical user interface to control the amount of glare reduction in accordance with another embodiment of the invention. A user may selectively control the amount of blending of the first and second images. For example, a user may select zero percent glare reduction and consequently, the resulting image is then the image recorded with no polarized filtering. In this case, no blending occurs between the two images and the image taken with polarized filtering may be either discarded or saved as a separate image. In this example, the user has selected a glare reduction of sixty-five percent. Accordingly, the blended image consists of sixty-five percent of the image taken with polarized filtering and thirty-five percent of the image taken without polarized filtering.

FIG. 4 illustrates a side view of an exemplary camera glare reduction system 400 in accordance with another embodiment of the invention. The camera glare reduction system 400 comprises image-capturing devices 402a and 402b (e.g., a film or a charged coupled device (CCD)), a shutter 403, a lens 404, a flash light source 408, a first polarized filter 410, a second polarized filter 405, a third polarized filter 406, and a beam splitter 420. The first polarized filter 410 polarizes the light emanating from the flash light source 408 in a substantially horizontal orientation (e.g., +90 degrees). The second polarized filter 405 performs substantially vertical (e.g., zero (0) degree) polarized filtering, and the third polarized filter 406 performs substantially horizontal polarized filtering, of the light received through the lens 404. As explained below, such camera glare reduction system 400 reduces glare attributed to the flash light source 408.

During a flash event, the light 416a emanating from the flash light source 408 gets polarized in a substantially horizontal orientation (e.g., +90 degrees). In this example, light 416a strikes a substantially reflective object 430. As discussed above, when polarized light 416a reflects off the substantially reflective object 430, the polarization of the reflected light 416b remains substantially horizontally polarized. As discussed above, the polarization of the second polarized filter 405 is substantially vertical (e.g., 0 degree) and the polarization of the third polarized filter 406 is substantially horizontal (e.g., +90 degrees). Light 116b entering the lens of the camera is split in two by beam splitter 420. Half of the light 116b is reflected towards second polarized filter 405 and image-capturing device 402b while the other half is transmitted towards third polarized filter 406 and image-capturing device 402a. Since the polarization of the light 416b reflected off reflective object 430 is substantially orthogonal to the polarization of the second polarized filter 405, the filter 405 substantially blocks the polarized light 416b from reaching image-capturing device 402b.

On the other hand, since the polarization of the light 416b reflected off reflective object 430 is substantially parallel to the polarization of the third polarized filter 406, the filter 406 substantially allows polarized light 416b to pass through to image-capturing device 402a.

As discussed above, light reflecting off of substantially non-reflective objects are able to propagate through filter 405. Thus, in addition to reducing unwanted light reflecting off of substantially reflective objects, the camera glare reduction system 400 allows the capture of light off generally non-reflective objects.

Although a still-picture camera is used to exemplify the invention, it shall be understood that the invention is also applicable to moving-image cameras where the light source 408 is continuously illuminating.

Furthermore, although a camera glare reduction system 400 with a single first polarized filter 410, a single second polarized filter 405, and a single third polarized filter 406 is used to exemplify the invention, it shall be under stood that the invention is also applicable to a system where one or more additional filters (i.e. notch filters) are used in conjunction with the original filters to increase the working range of the visual light spectrum that can be handled by the original filters.

In this preferred embodiment, as illustrated in FIG. 4, the images captured by light sensitive devices 402a and 402b may be selectively blended, as discussed above. Image captured by image-capturing device 402b will have substantially all the camera glare removed while the image captured by image-capturing device 402a will contain substantially all the camera glare. In this embodiment, devices 402a and 402b capture the same image, though with different levels of camera glare removed. This allows only one image to be taken, though split between the two filters 405 and 406 by beam splitter 420. An algorithm, as discussed above, will be used to blend the two images based on the user's selected glare reduction level. By splitting only one image, this embodiment helps to prevent any possible blinking by the subject or blurring of the subject image due to camera movement by the user or movement of the subject itself during the time between the taking of the first and second images as per the embodiment of FIG. 3.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A camera or video system, comprising:
   a light source;
   a first polarized filter for polarizing light emanating from said light source, wherein said first polarized filter comprises an active polarized filter;
   a second polarized filter for performing polarized filtering on a received light of which at least a portion originates from said light source;
   an image-capturing device for receiving said filtered light;
   an input device; and
   a processor for controlling said polarization of said active polarized filter in response to a signal generated by said input device.

2. The camera or video system of claim 1, further comprising a computer readable medium including one or more software modules for controlling said processor in controlling said polarization of said active polarized filter in response to said signal generated by said input device.

3. A camera or video system, comprising:
   a light source;
   a first polarized filter for polarizing light emanating from said light source;
   a second polarized filter for performing polarized filtering on a received light of which at least a portion originates from said light source, wherein said second polarized filter comprises an active polarized filter;
   an image-capturing device for receiving said filtered light;
   an input device; and
   a processor for controlling said polarization of said active polarized filter in response to a signal generated by said input device.

4. The camera or video system of claim 3, further comprising a computer readable medium including one or more software modules for controlling said processor in controlling said active polarized filter in response to said signal generated by said input device.

5. A camera or video system, comprising:
   a light source;
   an image-capturing device for receiving light from said light source;
   a polarized filter;
   an actuator for selectively moving said polarized filter into and out of a path of said light;
   an input device; and
   a processor for controlling said actuator in moving said polarized filter in response to a signal generated by said input device.

6. The camera or video system of claim 5, further comprising a computer readable medium including one or more software modules for controlling said processor in controlling said actuator move said polarized filter in response to said signal generated by said input device.

7. A method of generating a resultant image, comprising:
   setting an active polarizing filter to a first polarization angle;
   recording a first image at a first time, wherein at least a portion of light used to generate said first image passes through said active polarizing filter when set to said first polarization angle;
   setting said active polarizing filter to a second polarization angle that is different than said first polarization angle;
   recording a second image at a second time different than said first time, wherein at least a portion of light used to generate said second image passes through said active polarizing filter when set to said second polarization angle; and
   blending said first and second images to form said resultant image.

8. The method of claim 7, wherein said first polarization angle and said second polarization angle are substantially 90 degrees apart.

9. The method of claim 7, wherein said first time and said second time occur at substantially the same brightness level of a light source used to generate said light.

10. The method of claim 7, wherein said blending comprises blending at least a portion of individual pixels of said first image with a portion of individual pixels of said second image.

11. The method of claim 7, wherein said blending occurs within a camera.

12. The method of claim 7, further comprising transferring said first and second images to an external device, wherein said external device performs said blending of said first and second images to generate said resultant image.

13. The method of claim 12, wherein said external device comprises a computer.

14. A camera or video system, comprising:
    a light source;
    a first polarized filter for polarizing light emanating from said light source;
    a beam splitter for splitting a portion of said polarized light into first and second light components;
    a second polarized filter for performing polarized filtering on said first light component;
    a first image-capturing device for generating a first image from said filtered first light component;
    a third polarized filter for performing polarized filtering on said second light component; a second image-capturing device for generating a second image from said filtered second light component; and
    a device for blending the first and second images to form an output image.

15. The camera or video system of claim 14, wherein said light source comprises a flash light or a continuous light source.

16. The camera or video system of claim 14, wherein a first polarization of said first polarized filter is substantially orthogonal to a second polarization of said second polarized filter and substantially parallel to a third polarization of said third polarized filter.

17. The camera or video system of claim 14, wherein said image-capturing device comprises a film.

18. The camera or video system of claim 14, wherein said image-capturing device comprises a charged coupled device (CCD).

19. The camera or video system of claim 14, wherein said first polarized filter comprises a plurality of polarized filters.

20. The camera or video system of claim 14, wherein said second polarized filter comprises a plurality of polarized filters.

21. The camera or video system of claim 14, wherein said third polarized filter comprises a plurality of polarized filters.

* * * * *